US011937014B2

(12) United States Patent
VanBlon et al.

(10) Patent No.: US 11,937,014 B2
(45) Date of Patent: Mar. 19, 2024

(54) PERMITTING DEVICES TO CHANGE SETTINGS RELATED TO OUTBOUND AUDIO/VIDEO STREAMED FROM ANOTHER DEVICE AS PART OF VIDEO CONFERENCE

(71) Applicant: Lenovo (Singapore) Pte. Ltd., Singapore (SG)

(72) Inventors: Russell Speight VanBlon, Raleigh, NC (US); Nathan Peterson, Oxford, NC (US); Mark Delaney, Raleigh, NC (US); Arnold Weksler, Raleigh, NC (US); John C. Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 100 days.

(21) Appl. No.: 17/697,469

(22) Filed: Mar. 17, 2022

(65) Prior Publication Data

US 2023/0300293 A1 Sep. 21, 2023

(51) Int. Cl.
*H04N 7/15* (2006.01)
*H04L 12/18* (2006.01)
(Continued)

(52) U.S. Cl.
CPC ........... *H04N 7/15* (2013.01); *H04L 12/1822* (2013.01); *H04N 21/439* (2013.01); *H04N 21/44* (2013.01);
(Continued)

(58) Field of Classification Search
CPC ............ G06Q 30/0643; H04L 12/1822; H04L 12/1827; H04L 65/403; H04L 67/131; H04L 12/1831; H04L 65/1053; H04L 65/1083; H04L 65/4038; H04L 65/4046; H04M 3/564; H04M 3/569; H04N 7/148; H04N 7/15; H04N 7/152; H04N 21/42203; H04N 21/439; H04N 21/44; H04N 21/4627; H04N 21/47217; H04N 21/4753; H04N 21/4788; H04N 5/268; H04N 7/147;
(Continued)

(56) References Cited

U.S. PATENT DOCUMENTS 6,795,106 B1 * 9/2004 Cooper ................... H04N 7/15
 348/E7.083
8,659,636 B2 * 2/2014 Firestone ............ H04L 65/4046
 348/14.09

(Continued)

*Primary Examiner* — Gerald Gauthier
(74) *Attorney, Agent, or Firm* — John M. Rogitz; John L. Rogitz (57) ABSTRACT

In one aspect, an apparatus may include at least one processor and storage accessible to the at least one processor. The storage may include instructions executable by the at least one processor to permit a first device to change one or more settings that are related to a video conference and that are associated with a second device's outbound stream of one or more of audio and video as part of the video conference. The instructions may also be executable to receive first input to change the one or more settings, where the first input may be instigated at the first device. Based on permitting the first device to change the one or more settings and based on receipt of the first input to change the one or more settings, the instructions may then be executable to change the one or more settings.

20 Claims, 6 Drawing Sheets

(51) Int. Cl.
  *H04N 21/439* (2011.01)
  *H04N 21/44* (2011.01)
  *H04N 21/4627* (2011.01)
  *H04N 21/4788* (2011.01)

(52) U.S. Cl.
  CPC ..... *H04N 21/4627* (2013.01); *H04N 21/4788* (2013.01)

(58) Field of Classification Search
  CPC .............. H04N 7/157; H04N 21/2365; H04N 21/4532; H04N 21/478; G06F 3/017; G06F 3/04817; G06T 19/006; G10L 15/08; G10L 17/00
  See application file for complete search history.

(56) References Cited

U.S. PATENT DOCUMENTS

| | | | | |
|---|---|---|---|---|
| 8,713,454 | B2* | 4/2014 | Sriraghavan | H04L 67/131 715/753 |
| 9,699,410 | B1* | 7/2017 | Nagabushanam | H04N 5/268 |
| 11,184,560 | B1* | 11/2021 | Mese | G10L 17/00 |
| 11,196,869 | B2* | 12/2021 | Lee | H04M 3/564 |
| 11,290,686 | B2* | 3/2022 | Peters | H04N 7/147 |
| 11,652,655 | B1* | 5/2023 | Yu | G10L 15/08 709/204 |
| 11,652,958 | B1* | 5/2023 | Geddes | H04L 12/1827 348/14.09 |
| 2007/0120965 | A1* | 5/2007 | Sandberg | H04N 7/15 348/E7.083 |
| 2008/0218586 | A1* | 9/2008 | Graham | H04M 3/569 348/14.09 |
| 2008/0297586 | A1* | 12/2008 | Kurtz | H04L 12/1827 348/E7.083 |
| 2010/0066805 | A1* | 3/2010 | Tucker | H04N 7/148 348/E7.083 |
| 2010/0073458 | A1* | 3/2010 | Pace | H04N 21/4532 348/E7.083 |
| 2010/0315484 | A1* | 12/2010 | Ramanathan | H04N 7/15 348/E7.083 |
| 2011/0043598 | A1* | 2/2011 | Tokumitsu | H04N 7/15 348/E7.083 |
| 2011/0093273 | A1* | 4/2011 | Lee | H04L 65/4038 348/E7.083 |
| 2012/0098922 | A1* | 4/2012 | Pennington | H04N 7/148 348/E7.083 |
| 2013/0147900 | A1* | 6/2013 | Weiser | H04N 7/152 348/E7.083 |
| 2013/0147903 | A1* | 6/2013 | Weiser | H04L 65/1053 348/E7.083 |
| 2013/0215215 | A1* | 8/2013 | Gage | H04N 7/152 348/14.08 |
| 2013/0314491 | A1* | 11/2013 | Vivekanandan | H04L 65/4038 348/14.08 |
| 2015/0106227 | A1* | 4/2015 | Gottlieb | G06Q 30/0643 705/26.8 |
| 2015/0244981 | A1* | 8/2015 | Johnson | H04N 21/42203 348/14.07 |
| 2016/0088259 | A1* | 3/2016 | Anderson | H04N 7/157 348/14.03 |
| 2016/0294892 | A1* | 10/2016 | Hata | H04L 65/403 |
| 2016/0366456 | A1* | 12/2016 | Martin | H04N 21/4753 |
| 2017/0318261 | A1* | 11/2017 | Dalvi | H04N 21/2365 |
| 2018/0004396 | A1* | 1/2018 | Ying | H04N 21/47217 |
| 2021/0076002 | A1* | 3/2021 | Peters | H04N 7/152 |
| 2021/0258364 | A1* | 8/2021 | Yang | H04L 12/1831 |
| 2021/0258427 | A1* | 8/2021 | Lee | H04L 12/1831 |
| 2022/0245288 | A1* | 8/2022 | Anderson | G06F 3/017 |
| 2023/0072914 | A1* | 3/2023 | Kohli | H04L 65/1083 |
| 2023/0137265 | A1* | 5/2023 | Thiel | G06T 19/006 348/14.08 |
| 2023/0231972 | A1* | 7/2023 | Nguyen | H04L 12/1827 348/14.08 |
| 2023/0246857 | A1* | 8/2023 | Boucheron | H04L 51/10 709/204 |
| 2023/0300250 | A1* | 9/2023 | Delaney | H04N 7/152 370/260 |
| 2023/0300293 | A1* | 9/2023 | VanBlon | H04L 12/1822 348/14.08 |

* cited by examiner

PERMITTING DEVICES TO CHANGE SETTINGS RELATED TO OUTBOUND AUDIO/VIDEO STREAMED FROM ANOTHER DEVICE AS PART OF VIDEO CONFERENCE

FIELD

The disclosure below relates to technically inventive, non-routine solutions that are necessarily rooted in computer technology and that produce concrete technical improvements. In particular, the disclosure below relates to techniques for permitting devices to change settings related to outbound audio/video that is streamed from another device as part of a video conference.

BACKGROUND

As recognized herein, electronic video conferences present a unique set of issues that do not necessarily arise with in-person conferences. As also recognized herein, among these issues is that audio and video streamed from one device is often not adequately optimized for presentation at other devices of other participants of the video conference. There are currently no adequate solutions to the foregoing computer-related, technological problem.

SUMMARY

Accordingly, in one aspect an apparatus includes at least one processor and storage accessible to the at least one processor. The storage includes instructions executable by the at least one processor to facilitate a video conference. The instructions are also executable to grant a first video conference participant permission to change, via a first device, one or more settings that are related to the video conference and that are associated with a second video conference participant's logon to the video conference using a second device different from the first device. The instructions are also executable to receive first input to change the one or more settings, with the first input being instigated at the first device. Based on the first input and the permission being granted, the instructions are executable to change the one or more settings.

In some example implementations, the one or more settings may include one or more audio settings. For example, the one or more audio settings may include a gain level of a microphone used to stream audible input from the second video conference participant as part of the video conference. As another example, the one or more audio settings may include a volume level of audio output from a speaker in communication with the second device. As yet another example, the one or more audio settings may include a selection of an active microphone used for streaming audible input from the second video conference participant as part of the video conference, where the selection may be from amongst at least two microphones accessible to the second device.

Additionally, or alternatively, in various example implementations the one or more settings may include one or more video settings. For example, the one or more video settings may include a zoom level of content being shared by the second device as part of the video conference. As another example, the one or more video settings may include a selection of an active camera used for streaming video of the second video conference participant as part of the video conference, where the selection may be from amongst at least two cameras accessible to the second device.

In various example embodiments, the apparatus may include a server that coordinates the transmission of audio and video streams between client devices as part of the video conference. Additionally, or alternatively, the apparatus may include the first device, where the first device may be a client device.

In another aspect, a method includes permitting a first device to change one or more settings that are related to a video conference and that are associated with a second device's outbound stream of one or more of audio and video as part of the video conference. The second device is different from the first device. The method also includes receiving first input to change the one or more settings, where the first input is instigated at the first device. Based on permitting the first device to change the one or more settings and based on receiving the first input to change the one or more settings, the method includes changing the one or more settings.

In some example implementations, the method may include changing the one or more settings at the second device itself, where the second device may manage the one or more settings.

Also in certain example implementations, the one or more settings may include a gain level of a microphone used to stream audible input from the second device to the first device as part of the video conference. Additionally, or alternatively, the one or more settings may include a selection of an active microphone used for streaming audible input from the second device to the first device as part of the video conference. As another example, the one or more settings may include a zoom level of content being shared by the second device as part of the video conference.

In certain example embodiments, the method may be executed by a server and/or a client device.

Also, if desired, permission for the first device to change the one or more settings may be received during setup of the video conference before the video conference begins. In addition to or in lieu of that, permission for the first device to change the one or more settings may be received during the video conference based on identification of selection of a selector presented on a display of the second device.

In still another aspect, at least one computer readable storage medium (CRSM) that is not a transitory signal includes instructions executable by at least one processor to permit a first device to change one or more settings that are related to a video conference and that are associated with a second device's outbound stream of one or more of audio and video as part of the video conference. The second device is different from the first device. The instructions are then executable to receive first input to change the one or more settings, where the first input is instigated at the first device. Based on permitting the first device to change the one or more settings and based on receipt of the first input to change the one or more settings, the instructions are executable to change the one or more settings.

Thus, in certain examples the one or more settings may include a gain level of a microphone used to stream audible input from the second device to the first device as part of the video conference.

The details of present principles, both as to their structure and operation, can best be understood in reference to the accompanying drawings, in which like reference numerals refer to like parts, and in which:

DETAILED DESCRIPTION

Among other things, the detailed description below discusses one participant of a video conference giving another person or people permission to adjust the first participant's audio and video. Permission may be granted in the associated calendar event itself, and/or in real-time during the video conference when a situation arises.

For example, someone might have a hard time turning up their microphone so others can hear them, to avoid audio feedback, etc. But this person may still allow another participant to adjust their microphone gain on their behalf to avoid audio that is too quiet or too loud.

Thus, the relevant participant for which outbound A/V settings are to be changed (e.g., the presenter/organizer of the video conference) may give final approval for others to change their settings. For example, the presenter may be presented with a prompt such as "Apply these microphone settings as recommended by your teammate?" along with an indication of the requested changes to the settings themselves.

Moreover, in certain examples such as if a participant joins the video conference specifically on a mobile device/smartphone (and/or specified/preconfigured device which might be relatively harder to use to adjust audio/video settings), the participant may auto-allow other specific participants/organizers to tweak their settings.

The disclosure below also discusses allowing requests/votes for settings changes (e.g., "Can you turn up mic volume?"). In certain examples, the requesting users may be kept anonymous, while in other examples they may not.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
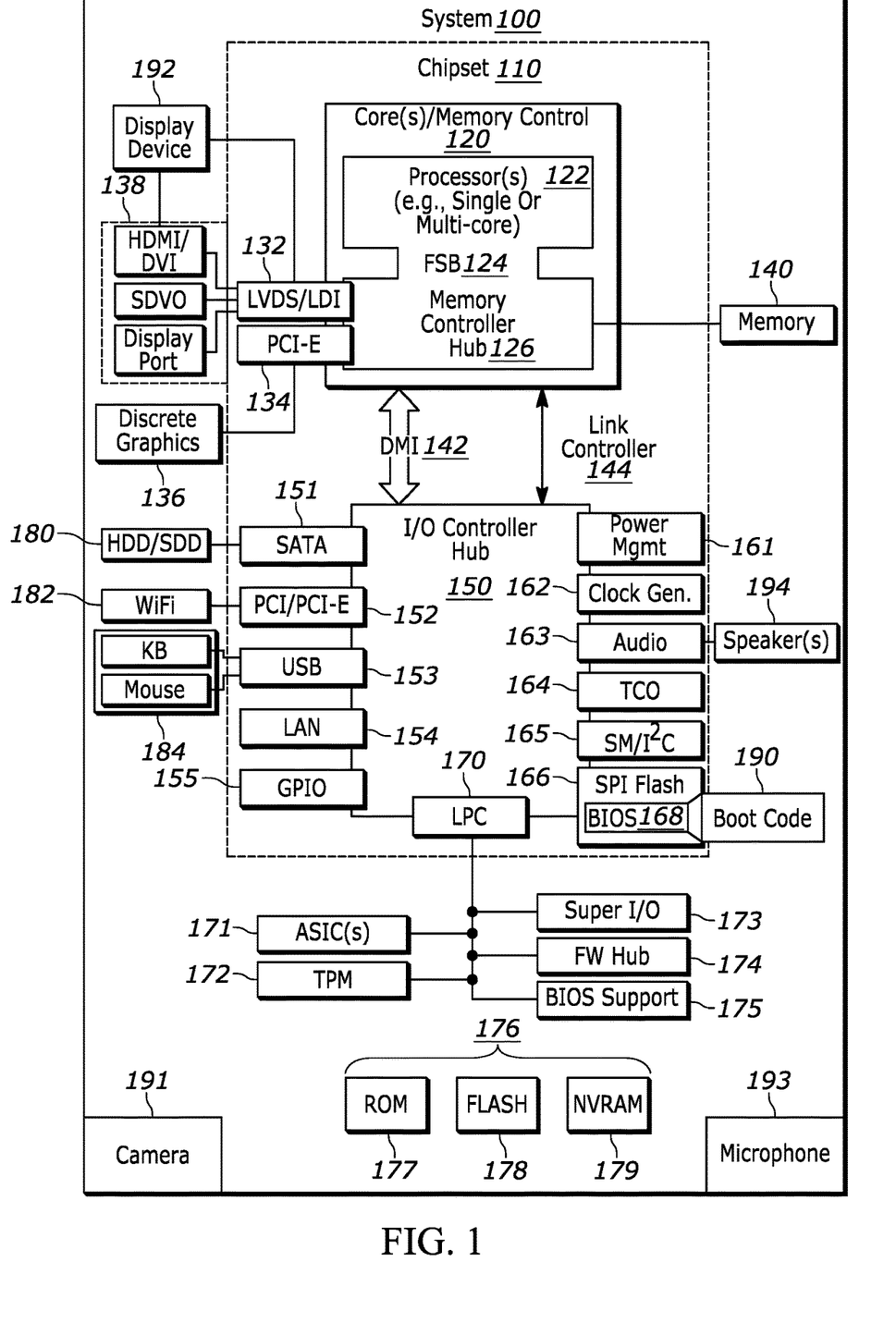
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 193 that provides input from the microphone 193 to the processor 122 based on audio that is detected, such as via a user providing audible input to the microphone 193 as part of a video conference and for other purposes. The system 100 may also include a camera 191 that gathers one or more images and provides the images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather still images and/or video for video conferencing and other purposes.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
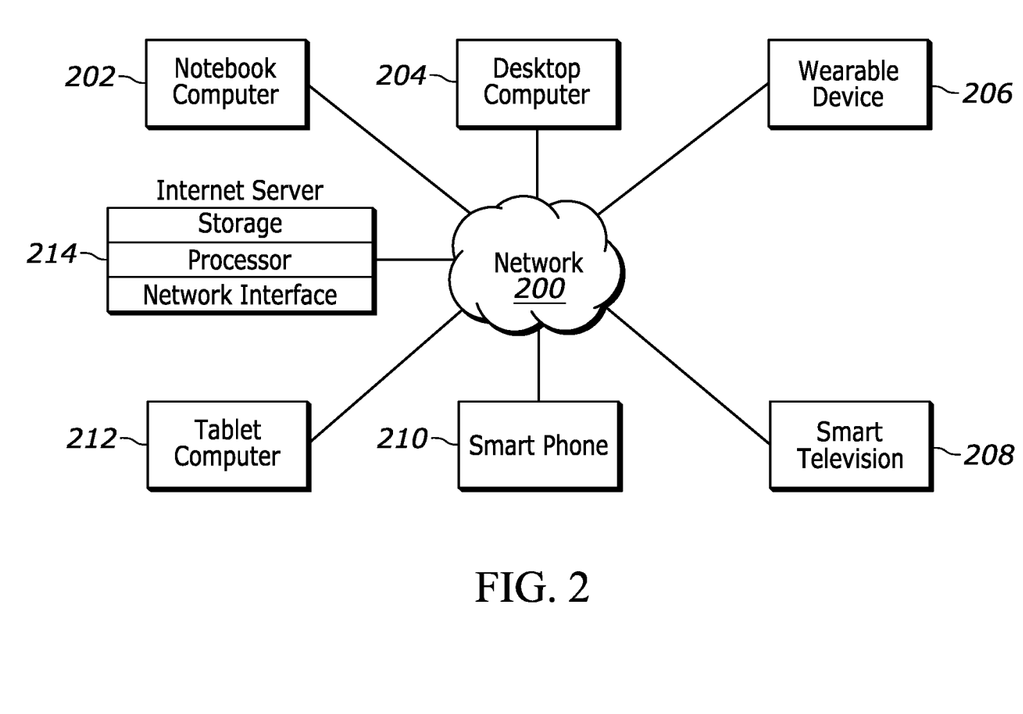
FIG. 2 is a block diagram of an example network of devices consistent with present principles.

Turning now to FIG. 2, example devices are shown communicating over a network 200 such as the Internet in accordance with present principles such as for video conferencing. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212 and route communications between the other devices 202-212 as part of video conferencing (e.g., routing audio/video feeds and metadata). It is to be understood that the devices 202-214 may be configured to communicate with each other over the network 200 to undertake present principles.

Figure 3:
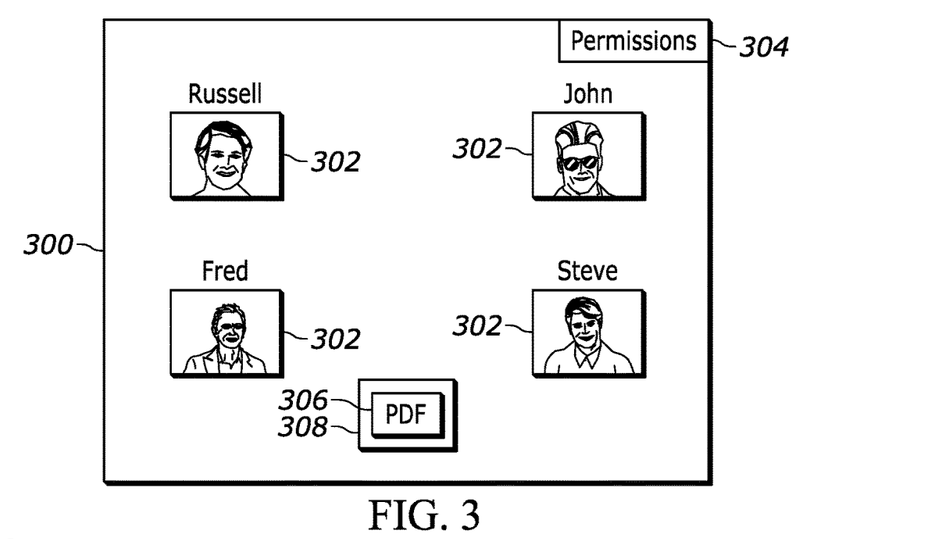
FIGS. 3-6 illustrate various example graphical user interfaces (GUIs) that may be presented during a video conference for others to be granted permission to change one or more outbound audio and/or video settings of a given participant's device consistent with present principles.

Now in reference to FIG. 3, suppose a video conference participant named Bob is using a smartphone, laptop, or other client device to participate in a video conference with four other people. FIG. 3 shows a graphical user interface (GUI) 300 that may be presented on the display of Bob's client device. As shown, the GUI 300 may include respective real-time video streams 302 of the other participants as captured by cameras on the client devices of the other participants themselves, with it being further understood that Bob's client device is also using local speakers to present real-time audio streams of the other participants as captured by microphones on the client devices of the other participants.

Now suppose that Bob wishes to grant one or more other participants permission to adjust outbound audio video (A/V) settings of his client device, where otherwise he might be the only participant who is able to change his own outbound A/V settings based on his own logon to the conference (e.g., each participant manages their own outbound A/V settings according to their own logon/logon link). For example, Bob might want to grant such permissions if Bob is having trouble adjusting the settings himself, or if he is unsure that his settings are optimized for presentation of his outbound audio/video streams at the client devices of the other participants.

Or as another example, Bob might wish to change another participant's outbound A/V settings as streamed from another client device to Bob's device if Bob himself cannot, for example, sufficiently hear the other participant or sufficiently view an electronic document 306 that is being shared in a window 308 of the GUI 300 as part of the video conference.

Figure 4:
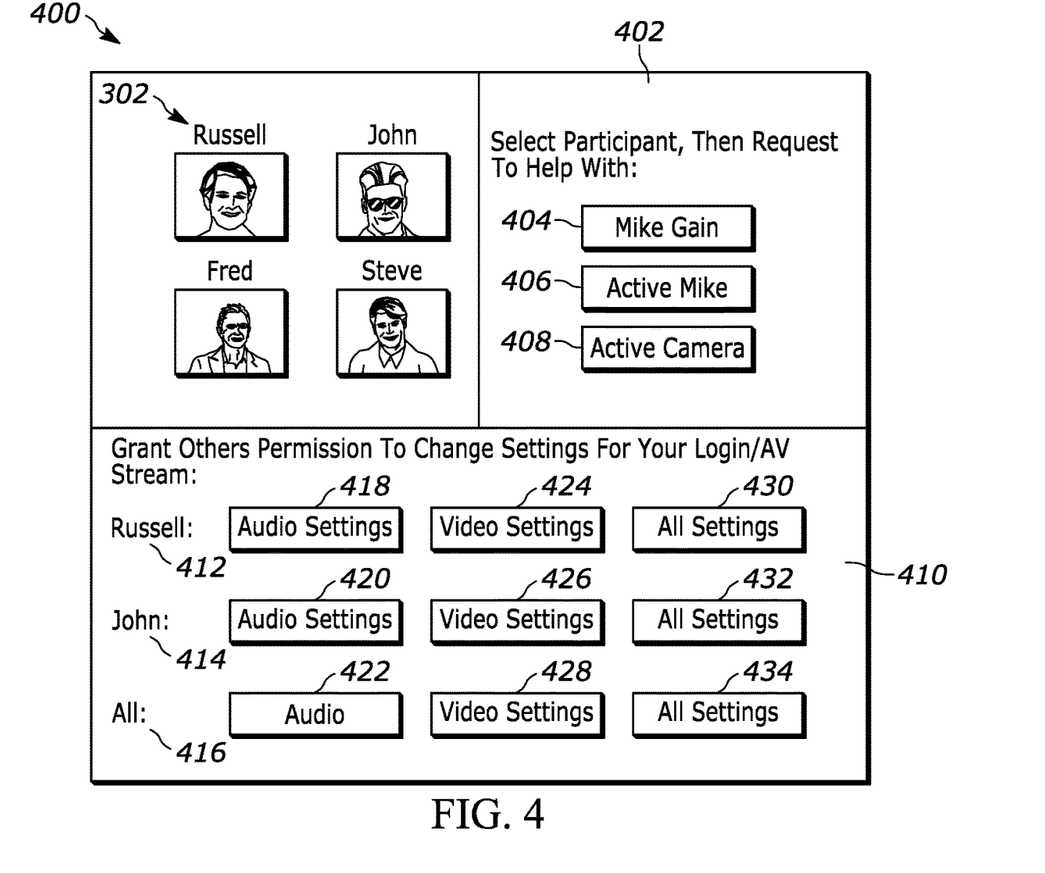

In either case—whether Bob wants to grant others permission to change his A/V settings to others or request permission to change another participant's settings—Bob may select the permissions selector 304 shown in FIG. 3 using touch, cursor, or other input to command his device to then present the GUI 400 of FIG. 4 in response. In this way, the GUI 300 remains relatively clutter-free but still provides, through the selector 304, a more-detailed GUI 400 at which various actions related to A/V settings permissions may be taken.

Thus, reference is now made to the GUI 400 of FIG. 4. As shown, the real-time video streams 302 are still being presented. The GUI 400 may also include a first panel 402 providing Bob the ability to request changes to another participant's outbound audio and/or video. As shown, the panel 402 may include a text prompt instructing Bob to select a participant first, which may be done by selecting the respective video stream 302 itself. The prompt also instructs that once another video conference participant has been selected, one of the selectors 404, 406, and 408 may be selected to instigate a request to the selected participant for Bob to be granted permission to change the other participant's outbound A/V settings.

While any particular setting discussed herein may therefore be listed as a respective selector, only three example selectors 404-408 are shown for simplicity. In the present example, the three selectors are a selector 404 that may be selectable to request a grant of permission to change the other participant's microphone gain, a selector 406 to request a grant of permission to change the other participant's active microphone, and a selector 408 to request a grant of permission to change the other participant's active camera.

As also shown in FIG. 4, a second panel 410 may also be presented as part of the GUI 400. The second panel 410 may provide Bob the ability to grant permissions to other participants for other participants to make change to settings related to Bob's own outbound A/V being streamed to others as part of the video conference.

Accordingly, FIG. 4 depicts that the second panel 410 may include a text prompt instructing Bob to grant others such permissions. As such, the panel 410 may also include sections at which individual participants may be granted permissions, which in this case includes a section 412 to grant the remotely-located participant Russel permissions and a section 414 to grant the remotely-located participant John permissions. If desired, the panel 410 may also include a section 416 granting all participants besides Bob permissions to change Bob's settings related to his outbound A/V feed(s).

Then for each respective section 412-416, respective selectors may be presented as shown. Thus, selectors 418, 420, and 422 are respectively selectable to grant permission respectively for Russell, John, or all participants to change Bob's outbound audio settings. Likewise, selectors 424, 426, and 428 are respectively selectable to grant permission respectively for Russell, John, or all participants to change Bob's outbound video settings. And selectors 430, 432, and 434 are respectively selectable to grant permission respectively for Russell, John, or all participants to change both Bob's outbound audio settings and outbound video settings.

Note here that the selectors 418-434 are provided as an example and that in addition to or in lieu of those selectors, the panel 410 may present individual selectors at each section 412-416 for each particular audio or video setting for which permission may be granted for the other respective participant to change that particular setting. For example, rather than an audio settings selector 418 being presented for section 412, both a microphone gain selector and an active microphone selection selector may be presented to grant Russell specific permissions to change Bob's microphone gain or active microphone, respectively. Further note that similar selectors may be presented for each section 412-416 for any specific settings contemplated herein, not just the ones shown in FIG. 4 as examples.

Then, responsive to one or more permissions being granted to one or more remotely-located participants via the GUI 400, the display on the client device of the remotely-located participant to which permissions have been granted may present a GUI like the GUI 600 of FIG. 6 that will be described later. However, FIG. 5 will be described first.

Figure 5:
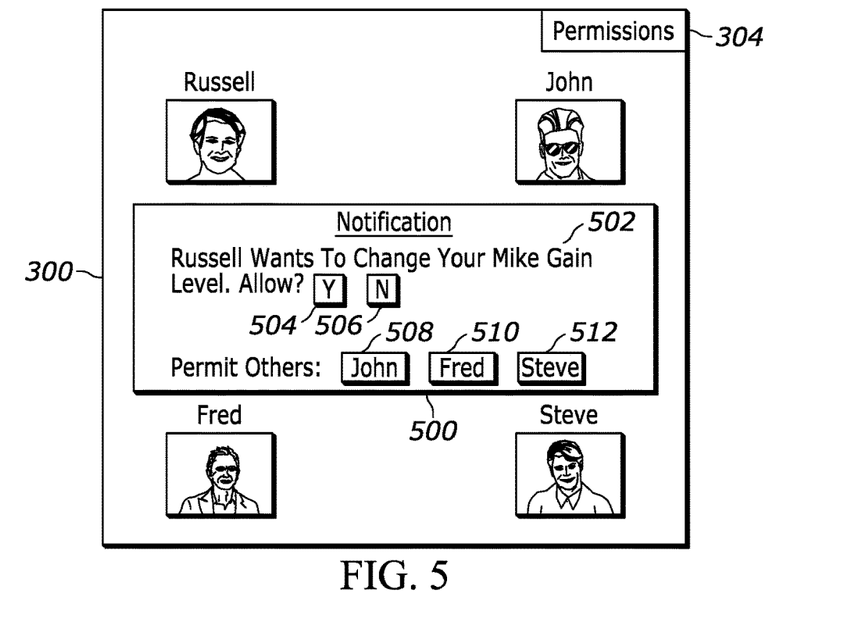

FIG. 5 shows another example way in which Bob may grant permissions to others to change one or more settings of his real-time outbound A/V feeds. Assume for FIG. 5 that another participant of the video conference has requested to change one or more settings of Bob's outbound audio and/or video, and that such a request was provided through a GUI like the GUI 400 but presented at the client device of the other conference participant. For example, the other participant may have used the panel 402 as presented on their own respective client device display.

In response to the other participant submitting the permission request to the conferencing system/Bob, the display on Bob's client device may present the GUI 500. As shown, the GUI 500 may be presented as a pop-up or overlay on the GUI 300 described above (as may have already been presented at Bob's device during the video conference). The GUI 500 may include a prompt 502 that another participant (Russell) has requested permission to change Bob's microphone gain level. The prompt 502 may be accompanied by a yes selector 504 for Bob's selection to provide the requested permission to Russell, as well as a no selector 506 for selection to deny the requested permission and hence deny Russell the ability to change Bob's microphone gain level.

Also note that in some examples, the GUI 500 may still include other options such as options 508-512 to respectively provide the same permission requested by Russell (changing Bob's microphone gain level) seamlessly to the other participants named John, Fred, and/or Steve instead. This may be done based on a single selection for each participant that is directed to one of the respective options 508-512.

Then once Bob has granted one or more permissions to others to change his outbound A/V settings either through the GUI 400 or 500 as described above, the GUI 600 may be presented on the display of the client device of the other participant for which permission(s) have been granted (Russell in this example). As shown, the GUI 600 may include respective real-time video streams 602 of the other respective participants of the video conference.

Overlaid on the GUI 600 may be another GUI 610 that may be presented as a pop-up. However, in other example embodiments the GUI 600 might be removed, and the GUI 610 presented by itself instead. In either case, as shown in FIG. 6, the GUI 610 may include a prompt 612 indicating that one or more permissions have been granted to the relevant participant, which again is Russell in this case. The GUI 610 may also include respective input elements to change the one or more specific settings for which permission has been granted. Here, assume that three different permissions have been granted to Russell and that interactive input elements may be presented for each one as part of the GUI 610 for Russell to then change the associated settings themselves.

Accordingly, as a first example, Russell may change Bob's microphone gain level up or down by moving a gain level slider 614 respectively up or down along a scale 616. The scale 616 may denote gain level increments from zero to ten or zero to one hundred, for example.

Russell may also change a selection of an active microphone used for streaming Bob's audible input to others as part of the video conference. For example, two or more local microphones may be accessible to Bob's client device for receiving audible input of Bob speaking, and they might even both be concurrently powered on. However, the conferencing system may be set to only stream input from one of those microphones as a real-time audio stream to other conference participants, and as such, that microphone is the active one.

Thus, if a certain active microphone was farther away from Bob than another available microphone and hence was not picking up Bob speaking that well, or if the active microphone were powered off or inaccessible even if currently set as the active microphone, Russell can change which microphone is selected as the active microphone. Accordingly, upon permission being granted to Russell, Russell may remotely change Bob's active microphone setting from selection of a first microphone on Bob's laptop computer (as currently shaded on the GUI 610 to denote it is the currently-selected active microphone) to another available microphone to which Bob's laptop is also currently connected. Here, as indicated on the GUI 610, the other microphone is a microphone of a Bluetooth headset that is currently being worn by Bob as detected by electrodes or touch sensors that might be located in an earpiece of the headset itself. Thus, Russell may select selector 618 to select the headset microphone as Bob's active microphone, or if desired may later select the selector 616 to switch back to the laptop microphone as the active microphone for streaming Bob's outbound audible input.

Figure 6:
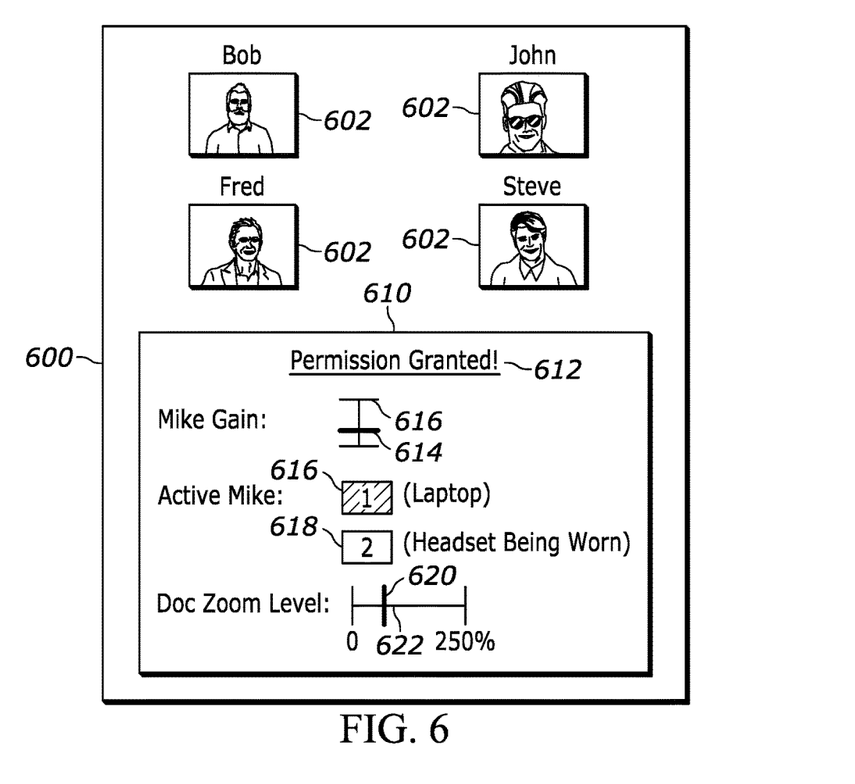

As also shown in FIG. 6, the example GUI 610 may further indicate that a zoom level of outbound video from Bob's device may also be changed by Russell, where in this case the video shows a digital document such as a word processing document or portable document format (PDF) document being shared by Bob as part of the video conference. Accordingly, Russell may change Bob's zoom level for the stream of the real-time view of the digital document (the current view of the document at Bob's client device as controlled by Bob) by moving a zoom level slider 620 respectively left and right along a scale 622 to zoom out or in, respectively. The scale 622 may denote zoom level increments from one to two hundred fifty percent, for example.

Additionally, note here that although not shown in FIG. 6, another example outbound video stream from Bob's client device for which zoom level may be adjusted may include the outbound real-time camera stream of Bob's face itself, and that a similar scale and slider may be presented as part of the GUI 610 upon permission being granted to Russell to adjust the zoom level of that video stream consistent with present principles.

Figure 7:
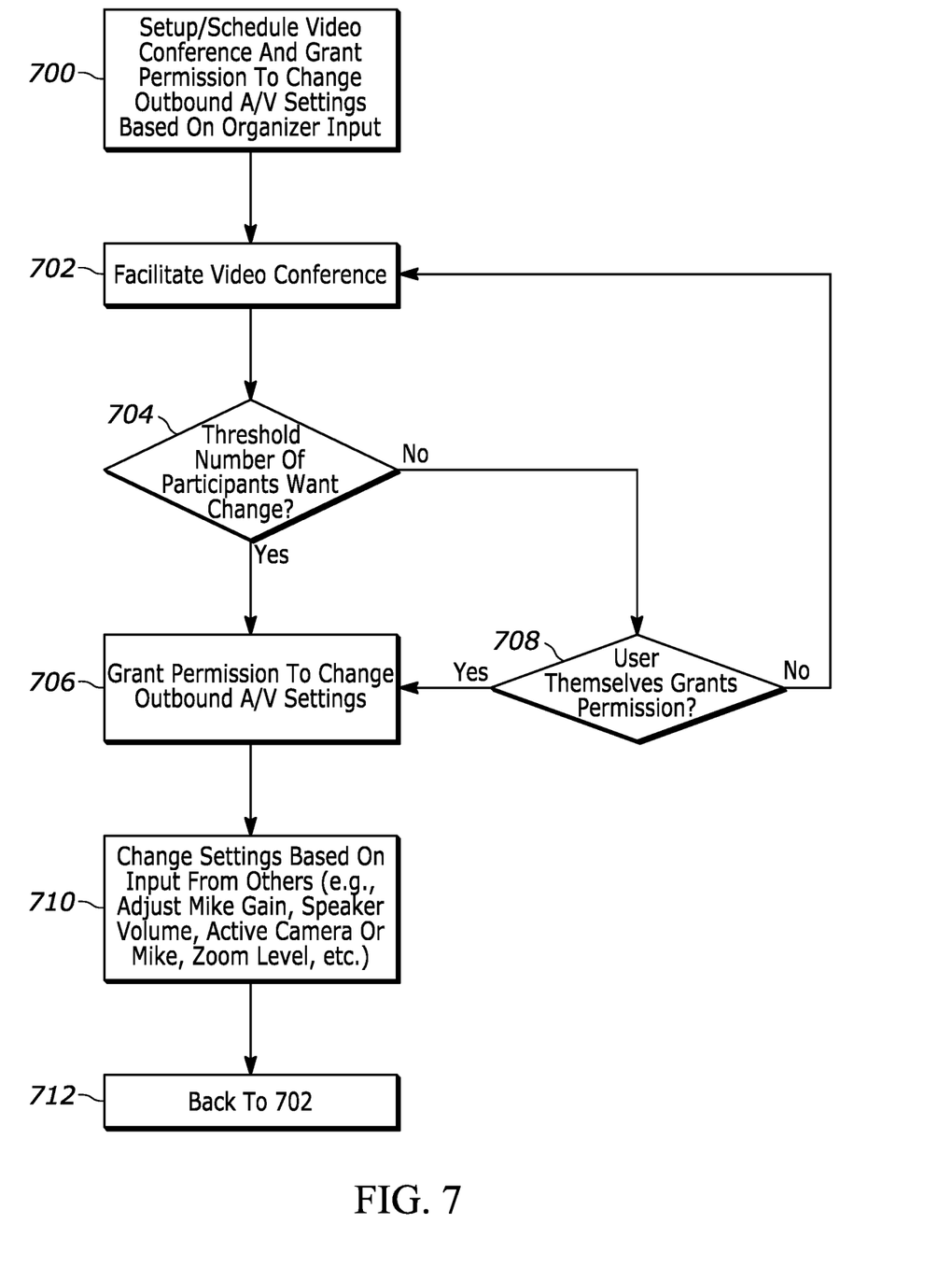
FIG. 7 illustrates example logic in example flow chart format that may be executed by a device consistent with present principles.

Referring now to FIG. 7, it shows example logic that may be executed by a device such as the system 100 in accordance with present principles. Thus, note that one or more of the steps in the logic below may be executed by one or more client devices and/or coordinating servers in any appropriate combination. Also note that while the logic of FIG. 7 is shown in flow chart format, other suitable logic may also be used.

Figure 8:
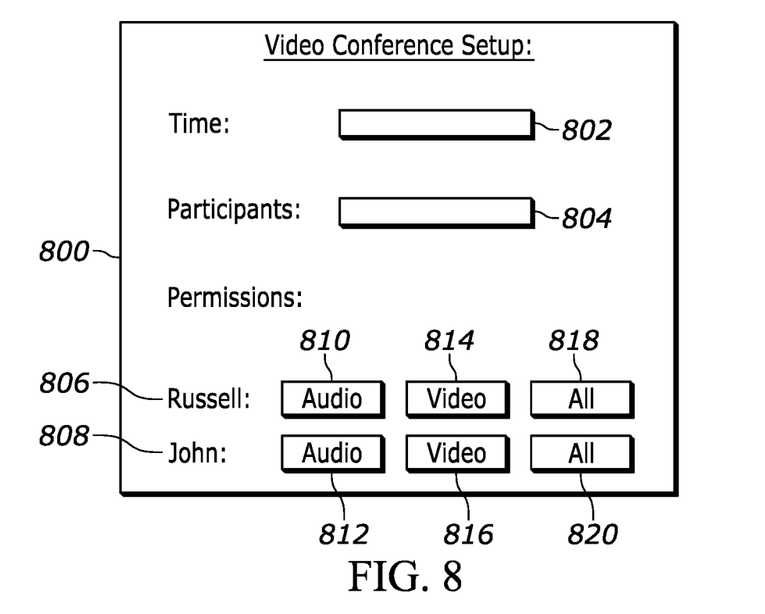
FIG. 8 illustrates an example GUI that may be presented as part of a video conference setup process to grant permissions before the relevant video conference begins consistent with present principles.

Beginning at block 700, the device may receive input to setup and/or schedule a video conference and then the device may setup/schedule the video conference accordingly. This may include reserving a timeslot in each participant's electronic calendar, sending meeting invites via email, etc. Also at block 700, if during setup the conference organizer has provided permissions for other participants to change the outbound A/V of the organizer themselves, those permissions may be granted before the video conference begins. But note even further that permissions provided during video conference setup need not be limited to permissions for outbound A/V of the organizer and that, for example, the organizer may permit another participant to change the outbound A/V of yet another participant using a GUI similar to the GUI 400 but during setup, for example. Or a GUI like the GUI 800 to be described later may be used for permission grants between the other participants.

In any case, the logic of FIG. 7 may then move from block 700 to block 702. At block 702, at the arranged beginning time, the device may begin facilitating the video conference by transmitting A/V content and metadata between conferencing devices, such as a client transmitting its local A/V data to others and receiving the A/V data of other participants for local presentation. Or also at block 702, a coordinating server may route the A/V communications between the client devices, possibly control one or more conferencing-related GUIs as presented locally at the client devices themselves, grant permissions already authorized by one or more participants, etc. From block 702 the logic may then proceed to decision diamond 704.

At diamond 704 the device may determine whether a threshold number of participants have requested to change an outbound audio and/or video stream for a given participant. Thus, here it is to be understood that in some specific examples a threshold number of participants greater than one may be required to request a change to a given aspect of outbound audio and/or video of another participant. This threshold may need to be met either before a GUI is presented to the participant for which outbound settings are to change for that participant to then authorize/permit them, and/or before automatic authorization/permission is granted to others during the video conference even without additional authorization input from the relevant participant themselves. The threshold may therefore be helpful so that, for example, if only one participant experiences an issue perceiving outbound A/V from another participant, the former may not be granted permission to change the associated setting unless still other participants on the call begin to experience the same issue and vote/request a similar change or permission grant.

An affirmative determination at diamond 704 may cause the logic to proceed to block 706 where the device may autonomously grant permission to the requesting participant(s) to change outbound A/V settings of the other participant without that other participant providing additional input (though in other examples, the other participant for which outbound A/V is to be adjusted may still have to provide additional input granting the associated permission when the logic arrives at block 706 based on an affirmative determination at diamond 704).

However, a negative determination at diamond 704 may instead cause the logic to proceed to decision diamond 708. At diamond 708 the device may determine whether the relevant participant themselves for which outbound A/V settings are to be adjusted has in fact granted permission. This may be in response to a request from others or based on that participant providing permission on their own (e.g., using the panel 410). A negative determination at diamond 708 may cause the logic to revert back to block 702 and continue therefrom. However, an affirmative determination at diamond 708 may instead cause the logic to proceed to block 706 where, as described above, the device may grant permission to the requesting participant(s) (and/or participants indicated by the relevant participant themselves for which outbound A/V settings are to be changed) to change the relevant outbound A/V settings.

As for granting the permissions themselves, note that remote access to the relevant client device's video conferencing software may be provided for a remote participant to instigate a change the relevant settings as maintained at the relevant client device itself (e.g., in instances where the relevant client device manages its own outbound A/V settings locally). Additionally, or alternatively, a coordinating server may receive the input to change the relevant settings as instigated at another device and then effect the change at the relevant client device and/or at the coordinating server itself.

Thus, from block 706 the logic may next proceed to block 710 where the device may actually receive the input from the one or more other participants to change the one or more settings of the relevant outbound A/V. From block 710 the logic may then proceed to block 712 where the logic may revert back to block 702 and proceed therefrom.

Referring back to block 710 for a moment, note again that settings that may be changed include audio settings such as a gain level of a microphone used to stream audible input as part of the video conference, a selection of an active microphone to use to stream the audible input, or even a volume level of audio output from a speaker in communication with the relevant client device. For example, a first participant's speaker may be presenting audio of the video conference using a stand-alone Bluetooth speaker, but that speaker may either be creating distortion or feedback in the first participant's microphone stream or just be playing the conference audio (or even separate audio like music) so loud that other participants on other ends of the video conference might not be able to sufficiently hear the first participant themselves. Thus, other participants may be granted permission to change the volume level of that speaker, if desired.

Also note again that settings that may be changed include video settings as well, such as a zoom level of content being shared as part of the video conference as set forth above (e.g., sharing a PDF) or selection of an active camera used for streaming outbound real time video of the relevant participant as part of the video conference. In terms of selecting an active camera, the selection may be from amongst at least two local cameras accessible to the client device from which the outbound video is being provided.

Taking the example of Bob again as the participant for which outbound A/V is to be changed, two or more local cameras may be accessible to Bob's client device for capturing a video stream of Bob speaking, and they might even both be concurrently powered on. However, the conferencing system may be set to only stream video from one of those cameras as a video stream to other conference participants, and as such, that camera is the active one for streaming real-time video of Bob. But if the currently-selected active camera is not providing a feed for other participants to adequately see Bob, or if it is not providing a feed at all like if it were powered off, inaccessible, or blocked by a lens cover, other participants may be permitted to remotely change selection of the active camera from that camera to another camera that is also available to Bob's client device. For example, the active camera may be set as the camera integrated into Bob's laptop, but since the laptop lid might be closed during the video conference (e.g., even if its processing components are still being used for the video conference), then another participant might select a stand-alone camera or camera on Bob's Bluetooth-paired smartphone as the active camera. The other participant may change the selection of the active camera using input elements similar to the input elements 616, 618 already described above, for example.

Continuing the detailed description in reference to FIG. 8, it shows an example GUI 800 that may be presented in advance of a video conference for setting up the conference itself. As shown, the GUI 800 may include input fields 802, 804 for an organizer to respectively enter a start time or time range for the conference as well as to enter one or more other participants of the video conference. If desired, to grant permissions to others to change outbound A/V settings of the organizer, the organizer may select from various selectors from a section 806 or 808 to grant the respective participant certain permissions consistent with present principles.

Thus, for each respective section 806, 808, respective selectors may be presented as shown. For example, selectors 810, 812 are respectively selectable to grant permission respectively for Russell and John to change Bob's outbound audio settings (where Bob is the organizer in this example). Likewise, selectors 814, 816 are respectively selectable to grant permission respectively for Russell and John to change Bob's outbound video settings. And selectors 818, 820 are respectively selectable to grant permission respectively for Russell and John to change both Bob's outbound audio settings and outbound video settings. Other types of selectors as already described above in reference to FIG. 4 may also be presented, such as selectors to grant all other participants certain permissions rather than just Russell and John.

Figure 9:
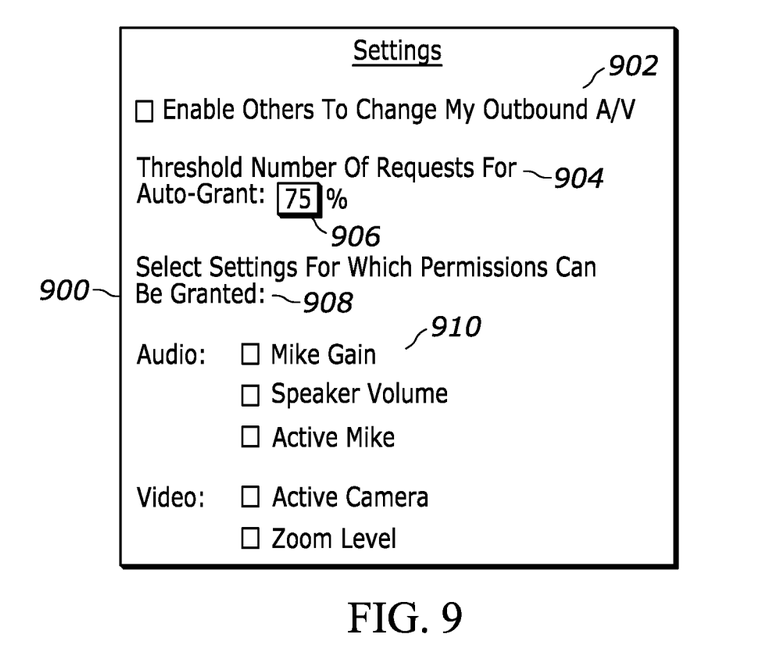
FIG. 9 shows an example settings GUI that may be used to configure one or more settings of a device to operate consistent with present principles.

Now in reference to FIG. 9, it shows an example settings GUI 900 that may be presented on a display to configure one or more settings of a device to operate consistent with present principles. For example, the GUI 900 may be presented on a client device display that might be undertaking the logic of FIG. 7 and other functions described above, though the GUI 900 may also be presented on a display of a system administrator's device or other device as well (such as the display for a coordinating server).

The settings GUI 900 may be presented to set or enable one or more settings of the device to operate consistent with present principles. The GUI 900 may be reached by navigating a main settings menu of the device or its operating system, or navigating a menu of a dedicated video conferencing application. Also note that in the example shown, each option discussed below may be selected by directing touch, cursor, or other input to the respective check box adjacent to the respective option.

As shown in FIG. 9, the GUI 900 may include an option 902 that may be selectable a single time to set or enable the device, system, software, etc. to undertake present principles for multiple future video conferences, such as executing the functions described above in reference to FIGS. 3-6 and executing the logic of FIG. 7 for different conferences that will occur in the future.

The GUI 900 may also include a setting at which a threshold number of participants may be set according to the description above in relation to diamond 704. Accordingly, input may be directed to input box 906 using a hard or soft keyboard to set the threshold as a percentage of all total participants of a given video conference, though other types of thresholds may be used such as simply a threshold number of people (e.g., two people may be the threshold).

The GUI 900 may also include a section 908 at which various particular outbound A/V settings may be selected for which permissions may be granted based on the threshold being reached, based on a request being submitted, etc. Accordingly, respective options 910 may be selected to select various respective settings for which permission may be granted. Thus, the user may elect to leave some boxes unchecked, which in turn will not allow others to even submit requests to change the associated setting in certain examples (e.g., if the user wishes to retain full control over that respective setting).

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. An apparatus, comprising:
   at least one processor; and
   storage accessible to the at least one processor and comprising instructions executable by the at least one processor to:
   facilitate a video conference;
   grant a first video conference participant permission to change, via a first device, one or more settings that are related to the video conference and that are associated with a second video conference participant's logon to the video conference using a second device different from the first device;

receive first input to change the one or more settings, the first input instigated at the first device; and based on the first input and the permission being granted, change the one or more settings;

wherein the one or more settings comprise one or more audio settings; and wherein the one or more audio settings comprise a selection of an active microphone used for streaming audible input from the second video conference participant as part of the video conference, the selection being from amongst at least two microphones accessible to the second device.

2. The apparatus of claim 1, wherein the one or more audio settings comprise a gain level of a microphone used to stream audible input from the second video conference participant as part of the video conference.

3. The apparatus of claim 1, wherein the one or more audio settings comprise a volume level of audio output from a speaker in communication with the second device.

4. The apparatus of claim 1, wherein the one or more settings comprise one or more video settings.

5. The apparatus of claim 4, wherein the one or more video settings comprise a selection of an active camera used for streaming video of the second video conference participant as part of the video conference, the selection being from amongst at least two cameras accessible to the second device.

6. The apparatus of claim 1, wherein the apparatus comprises a server that coordinates the transmission of audio and video streams between client devices as part of the video conference.

7. The apparatus of claim 1, wherein the apparatus comprises the first device, the first device being a client device.

8. The apparatus of claim 1, wherein the first input is received during setup of the video conference before the video conference begins.

9. The apparatus of claim 1, wherein the first input is received during the video conference based on identification of selection of a selector presented on a display of the second device.

10. A method, comprising:

permitting a first device to change one or more settings that are related to a video conference and that are associated with a second device's outbound stream of one or more of audio and video as part of the video conference, the second device being different from the first device;

receiving first input to change the one or more settings, the first input instigated at the first device; and based on permitting the first device to change the one or more settings and based on receiving the first input to change the one or more settings, changing the one or more settings;

wherein the one or more settings comprise one or more audio settings; and wherein the one or more audio settings comprise a selection of an active microphone used for streaming audible input from the second device as part of the video conference, the selection being from amongst at least two microphones accessible to the second device.

11. The method of claim 10, comprising:

changing the one or more settings at the second device, the second device managing the one or more settings.

12. The method of claim 10, wherein the one or more settings comprise a gain level of a microphone used to stream audible input from the second device to the first device as part of the video conference.

13. The method of claim 10, wherein permission for the first device to change the one or more settings is received during setup of the video conference before the video conference begins.

14. The method of claim 10, wherein permission for the first device to change the one or more settings is received during the video conference based on identification of selection of a selector presented on a display of the second device.

15. The method of claim 10, wherein the one or more settings comprise one or more video settings, and wherein the one or more video settings comprise a selection of an active camera used for the outbound stream of video as part of the video conference, the selection being from amongst at least two cameras accessible to the second device.

16. The method of claim 10, wherein the one or more audio settings comprise a volume level of audio output from a speaker on the second device.

17. At least one computer readable storage medium (CRSM) that is not a transitory signal, the at least one computer readable storage medium comprising instructions executable by at least one processor to:

permit a first device to change one or more settings that are related to a video conference and that are associated with a second device's outbound stream of video as part of the video conference, the second device being different from the first device;

receive first input to change the one or more settings, the first input instigated at the first device; and based on receipt of the first input to change the one or more settings, change the one or more settings;

wherein the one or more settings comprise one or more video settings; and wherein the one or more video settings comprise a selection of an active camera used for the outbound stream of video as part of the video conference, the selection being from amongst at least two cameras accessible to the second device.

18. The at least one CRSM of claim 17, wherein the one or more settings comprise one or more audio settings, and wherein the one or more audio settings comprise a selection of an active microphone used for streaming audio from the second device as part of the video conference, the selection being from amongst at least two microphones accessible to the second device.

19. The at least one CRSM of claim 17, wherein the first input is received during setup of the video conference before the video conference begins.

20. The at least one CRSM of claim 17, wherein the first input is received during the video conference based on identification of selection of a selector presented on a display of the second device.

* * * * *